(12) United States Patent
Fukumori et al.

(10) Patent No.: US 7,077,570 B2
(45) Date of Patent: Jul. 18, 2006

(54) ZIPPER TAPE FOR A BAG AND METHOD OF PRODUCING THE SAME

(75) Inventors: Hirotsugu Fukumori, Yokohama (JP); Nobuyuki Kawai, Owariasahi (JP); Hirozo Amano, Kasugai (JP); Nobuhiko Morikawa, Komaki (JP); Kazuhiko Nakajima, Nagakute-machi (JP); Satoshi Fujioka, Nagoya (JP)

(73) Assignee: J.P.M. Co., Ltd. (JP)

( * ) Notice: Subject to any disclaimer, the term of this patent is extended or adjusted under 35 U.S.C. 154(b) by 255 days.

(21) Appl. No.: 10/716,888

(22) Filed: Nov. 18, 2003

(65) Prior Publication Data

US 2004/0098845 A1    May 27, 2004

Related U.S. Application Data

(62) Division of application No. 10/191,847, filed on Jul. 9, 2002, now Pat. No. 6,808,666.

(51) Int. Cl.
*B65D 33/16* (2006.01)

(52) U.S. Cl. ..................... 383/63; 24/585.12
(58) Field of Classification Search ........... 383/63; 24/585.12, 585.1, 584.1, 586.1
See application file for complete search history.

(56) References Cited

U.S. PATENT DOCUMENTS

| | | | |
|---|---|---|---|
| 5,121,997 A * | 6/1992 | La Pierre et al. | 383/203 |
| 5,335,997 A * | 8/1994 | Kanemitsu et al. | 383/63 |
| 5,700,091 A * | 12/1997 | Tanaka et al. | 383/63 |
| 6,092,931 A * | 7/2000 | Tilman | 383/63 |
| 6,152,601 A * | 11/2000 | Johnson | 383/210 |
| 6,808,666 B1 * | 10/2004 | Fukumori et al. | 264/145 |

FOREIGN PATENT DOCUMENTS

JP          1908600         4/1991

* cited by examiner

*Primary Examiner*—Jes F. Pascua
(74) *Attorney, Agent, or Firm*—McGlew & Tuttle, PC

(57) ABSTRACT

A zipper tape is provided which can freely be used regardless of whether the zipper tape is made from a polypropylene-based resin or a polyethylene-based resin and also on which letters can be printed or any color can be given thereto. A method of producing the zipper tape with high productivity by means of extruding male strips and female strips in rows in a batch is provided. The zipper tape (2) with the mating section (3) (the male strip (3a) and the female strip (3b)) formed thereon has a three-layered structure comprising the heat-insulating film (6) as an intermediate layer, the thermally fused film (7) thermally fused and bonded to one side of the heat-insulating film (6) of the bag (5), and the thermally fused film (8) for formation of a mating section bonded to another side of the bag (5). The male strips (3a) and female strip (3b) for forming a mating section together are extruded from the miscellaneous extrusion molding machine (101) onto a surface of the thermally fused film (8) for forming a mating section in rows in the state where adjoining male and female strips form pairs respectively and are thermally fused and bonded to the base tape. Then the base tape is cut along each strip with the adjoining male strip (3a) and female strip (3b) mated with each other to form the mating section (3), and is wound up to provide a product. Letters, marks, or colors are printed on or given to the mating sections (102) and (104) on the base tapes (101) and (103) respectively.

3 Claims, 11 Drawing Sheets

A-A

A'-A'

A-A

A'-A'

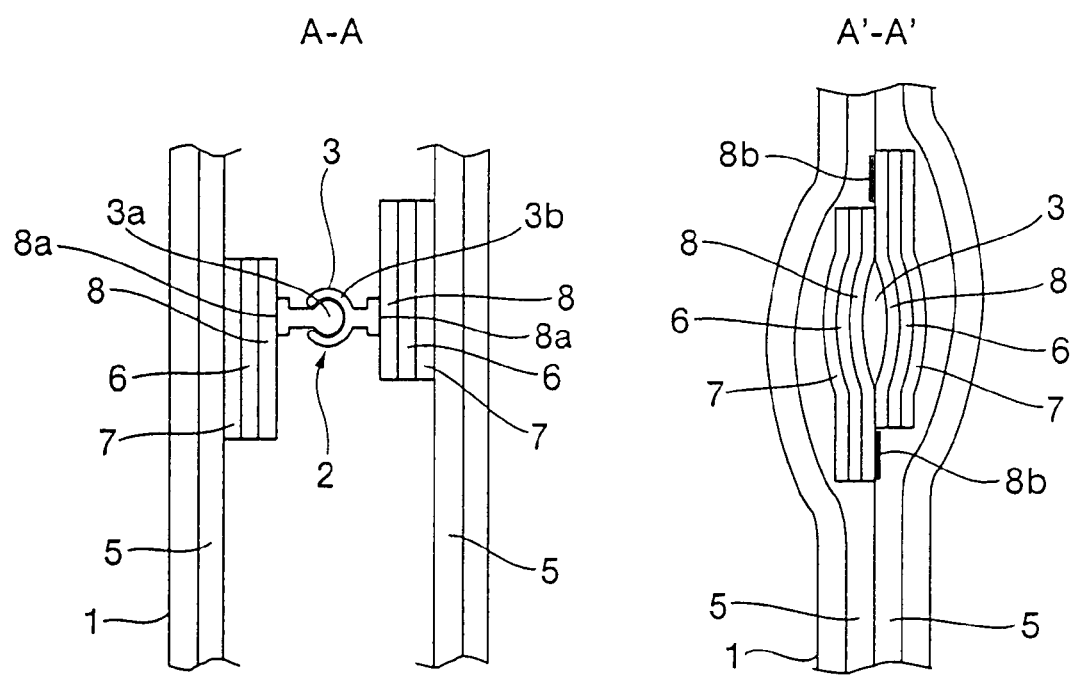

ZIPPER TAPE FOR A BAG AND METHOD OF PRODUCING THE SAME

This application is a divisional of Ser. No. 10/191,847, filed Jul. 09, 2002, now U.S. Pat. No. 6,808,666.

FIELD OF THE INVENTION

The present invention relates to a method of producing a zipper tape agglutinated in use to a bag for packaging as well as to a zipper tape produced by the production method, and more specifically to a zipper tape having a mating section comprising a male strip and a female strip and a method of producing the zipper tape.

BACKGROUND OF THE INVENTION

Bags for packaging which have a zipper tape closure are very popular. These bags can easily and repeatedly be opened and closed. It is generally expected in the market that a bag with a zipper tape will be used more and more in the future.

The conventional type of zipper tape is generally based on a polyethylene system or a polypropylene system, and a male strip and a female strip forming a pair extending in a row and used to form a mating section. The strips are integrally formed on a tape, and the tape is cut in use along a center line thereof to provide a slender section with a male strip and that with a female section. When this zipper tape is agglutinated in use to a bag 1 for packaging as shown in FIG. 1, the cross section taken along the line A—A in the figure is as shown in FIG. 2(A), and a tape section 4 with a male strip 3a and a female strip 3b formed thereon is based on a polyethylene system when a resin used for an innermost layer 5 of a bag 1 for packaging is a polyethylene-based one, while the tape section 4 is based on a polypropylene system when the resin for the innermost layer 5 is a polypropylene-based one.

However, the conventional type of zipper tape has the defects as described below.

a) At first, when the zipper tape 2 is produced by means of miscellaneous shape extrusion molding, the male strip 3a and the female strip 3b are respectively formed on the tape section 4 in an integrated state therewith as shown in FIG. 2(A), and in this production method, it is impossible to mold a plurality of male strips and a plurality of female strips simultaneously in batch, and the two types of strips are formed only as a pair by means of extrusion molding, so that the productivity is low.

b) When the zipper tape 2 is agglutinated to the bag 1 for packaging, when the innermost layer 5 of the bag 1 and the tape section 4 of the zipper tape 2 are jointed to each other by loading a pressure and heating the jointed section from the outside as shown in FIG. 2(A), as there is the risk that the tape section 4 itself may be fused there is no way but to make the thickness of the tape section 4 larger.

Because of the requirement described above, when a pressure and heat are applied from the outside for making side seals 1a, 1b of the bag 1 for packaging as shown in FIG. 2(B), the mating section 3 and the tape section 4 form together a fused resin block 3', 4', and the section expands, so that the pressure and heat required for sealing must be strong, which causes other sealed sections to be heated excessively. On the contrary, when the pressure and heat used for sealing are weak, the resin block 3', 4' is not fully fused such that pin holes are easily generated therein.

d) In the zipper tape 2 comprising the mating section 3 made from a polyethylene-based resin and the tape section 4, as the innermost layer 5 of the bag 1 for packaging is thermally fused only the polyethylene-based bag, so that the zipper tape 2 can not be used for a bag made from a polypropylene-based resin. On the other hand, the zipper tape 2 made from a polypropylene-based resin can not be used for the bag 1 made from a polyethylene-based resin, and therefore the zipper tape 2 must be selected according to a material used for forming the innermost layer 5 of the bag 1.

Improved types of zipper tapes have been disclosed for the purpose to solve the problems as described above. As the most representative technology, there is the technology in which a heat-insulating film 6 having a melting point higher than that of the tape section 4 is laminated on the tape section 4 of the zipper tape 2 and further a film 7 for thermal fusion having a melting point lower than that of the heat-insulating film 6 is laminated on the heat-insulating film 6 (Japanese Patent No. 1908600). Namely, in the zipper tape 2, which is applied to the bag 1 for packaging shown in FIG. 1, the cross section A—A is as shown in is enlarged form in FIG. 3(A), while the cross section A'—A' is as shown in its enlarged form in FIG. 3(B).

With this improved type of zipper tape 2, some of the problems in the conventional technology have been solved, but the following ones are still left unsolved.

e) When the zipper tape 2 is produced by means of the miscellaneous shape extrusion molding, the male strip 3a and the female strip 3b are formed integrally on the tape section 4 respectively, so that there is no way but to form the two types of strips in a pair and in a row, so that the productivity is not improved.

f) When the innermost layer 5 of the bag 1 and the thermally-fused film 7 of the zipper tape 2 are pressed to each other and heated for sealing, the risk that the tape sections 4 facing to each other are thermally fused to each other is evaded because of the presence of the heat-insulating film 6 as shown in FIG. 3(A), and this improvement advantageously makes it possible to reduce the total thickness of the tape section 4, heat-insulating film 6, and thermally fused film 7 down to about 100μ.

g) When the side seals 1a, 1b are made in the bag 1, the thickness of the fused resin block 3', 4', where the mating section 3 and the tape section 4 are integrated to each other, is reduced in proportion to the reduced thickness of the tape section 4 as shown in FIG. 3(B), but the reduction in thickness is still insufficient.

h) In a case of the zipper tape 2 made from a polyethylene-based resin, also the thermally fused film 7 and the innermost layer 5 of the bag 1 must be made from the polyethylene-based resin, and further in a case of the zipper tape 2 made from a polypropylene-based resin, also the thermally fused film 7 and the innermost layer 5 of the bag 1 must be made from the polypropylene-based resin, and this technological limitation still remains unsolved.

i) In the conventional type of zipper for a bag, two sheets of base tapes to be sealed on an inner surface of the bag, and the male strip and the female strip respectively formed on this base tape are integrally formed by an extrusion molding machine.

Because of this requirement, when it is desired to give a specific color to the zipper tape for the purpose to indicate that the zipper tape is attached to inside of an upper open section of the bag or to make the zipper tape colorful, it is necessary to add a coloring material to a resin used as a material for the tape and to extrude the colored resin from the extrusion molding machine.

j) For the reason described above, it is possible to give a specific color to the zipper tape as a whole, but it is impossible to give a color only to the male and female strips, nor to give different colors to the mating section and base tape respectively, and therefore when designing a bag with a zipper, options in designing the zipper section are disadvantageously limited as compared to those allowable in other sections.

k) Further, once the zipper tape has been set in an upper open section of a bag, only a surface of the base tape and the mating section can directly be checked visually, and it is impossible, because of the presence of the mating section, to print on the zipper tape an alerting message such as, for instance, that "If the zipper tape color has not changed to blue, please check and confirm again that the zipper tape has completely be closed" for alerting a user to check whether the mating section has been completely closed. It is desired to print this type of alerting message there.

OBJECT OF THE INVENTION

The present invention was made in the light of the circumstances as described above, and it is a first object of the present invention to provide a zipper tape with the large width and having a structure allowing formation of a plurality of pairs of a male strip and a female strip each pair extending in a row on the zipper tape and a method of producing the zipper tape.

It is a second object of the present invention to provide a zipper tape making it possible to reduce a fused resin block, which is generated at the mating section when side sealing for the bag is made, as much as possible to prevent generation of pin holes therein and also to ensure the provision of a good appearance of the bag and also to provide the method of producing the same.

Further it is a third object of the present invention to provide a zipper tape compatible with an innermost layer of a bag regardless of whether the innermost layer is made from a polypropylene-based resin or a polyethylene-based resin and also capable of eliminating the necessity of selecting a zipper tape made from the same material as that used for an innermost layer of the bag and also to provide the method of producing the zipper tape.

It is a fourth object of the present invention to provide a zipper tape for a bag allowing printing of any letter and figure or the like with any color on a surface of the base tape.

It is a fifth object of the present invention to make it possible for a user of a bag to visually determine that a zipper tape has been fitted to inside of an upper open section of the bag by printing thereon a remark indicating presence of the zipper tape or giving any specific color to the zipper tape.

It is a sixth object of the present invention to improve commercial value of a product packaged in a bag for the purpose to contribute to increase of sales in the market by making it possible to make a design of a surface of the bag more colorful especially in the section where the zipper tape is fitted to the bag.

BRIEF DESCRIPTION OF THE DRAWINGS

FIG. 5(A) is a cross-sectional view showing a portion of the zipper tape with a zipper tape according to the present invention used therein, the portion of the bag corresponding to the portion indicated by the line A—A in FIG. 1;

FIG. 5(B) is an explanatory view showing the state where the tape section is off from the regular position in the side seal section corresponding to the section indicated by the line A'—A' in FIG. 1;

DETAILED DESCRIPTION OF THE PREFERRED EMBODIMENTS

Figure 4A:
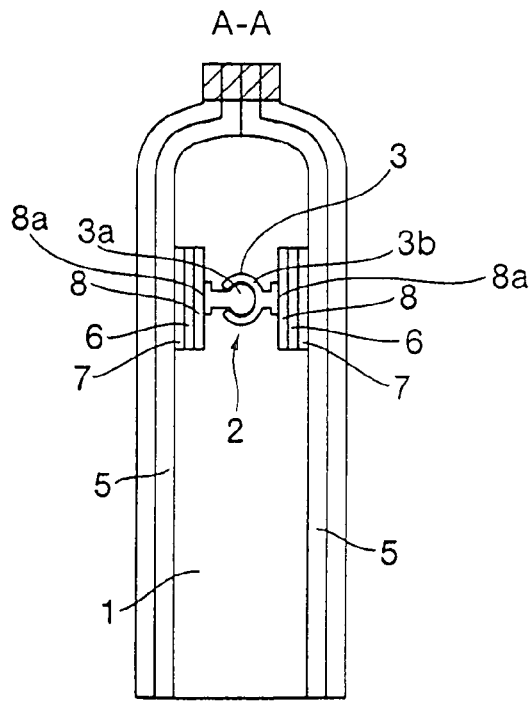
FIG. 4(A) is a cross-sectional view showing a portion of a bag with a zipper tape according to the present invention fitted therein, the portion of the bag corresponding to the section indicated by the line A—A in FIG. 1.

A first different point of a zipper tape 2 according to the present invention from the improved type of zipper tape 2 described above is that a male strip 3*a* and a female strip 3*b* on the zipper tape 2 are, different from that in the conventional technology. According to the invention, male strip 3*a* and female strip 3*b* are not molded in the integrated state with a fused film 8 for forming a mating section as shown in FIG. 4(A). Also, a base tape including the fused film 8 for forming a mating section is previously produced, then only the male strip 3*a* and female strip 3*b* are extrusion-molded by a miscellaneous shape extrusion molding machines. The male and female strips 3*a* and 3*b* are then fused and bonded at 8*a* to a surface of the fused film 8 for formation of a mating section respectively.

Figure 1:
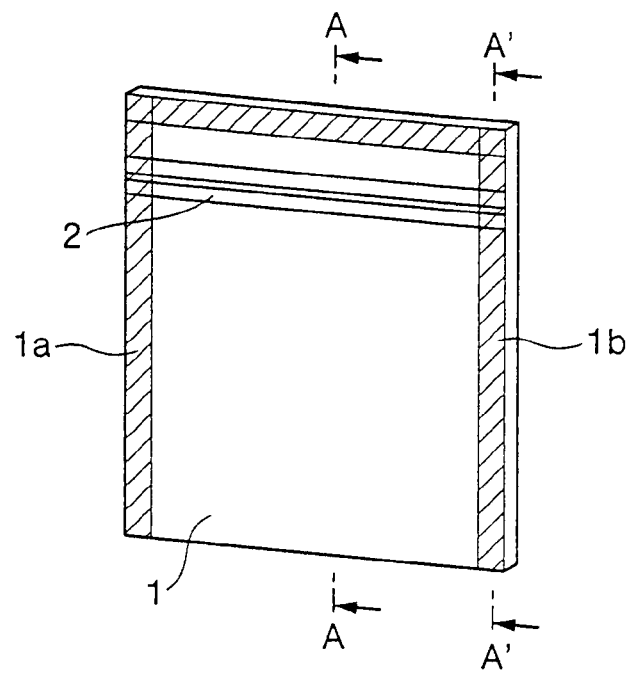
FIG. 1 is an explanatory view showing a bag with the conventional type of zipper tape fitted therein.
Figure 4B:
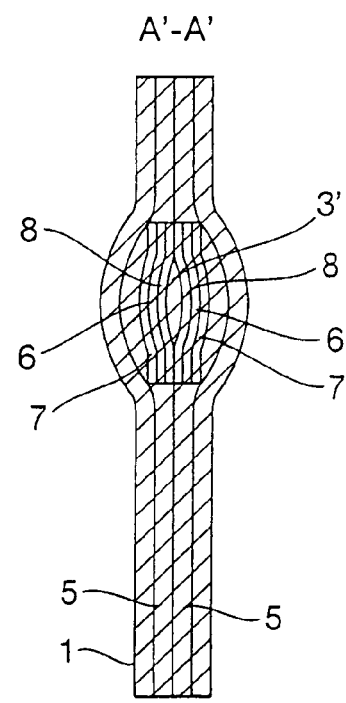
FIG. 4(B) is an explanatory view showing a resin block in the side seal section corresponding to the section indicated by the line A'—A' in FIG. 1.

The reason for the employment of the production sequence as described above is based on the fact recently discovered by the present inventors that, when the zipper tape 2 is fitted to the inside of an open section of the bag 1 and side seals 1a, 1b are made similar to that as shown in FIG. 1, by processing, different from the conventional technology, only the mating section 3 into the fused resin block 3' by means of applying a pressure and heat thereto for sealing as shown in FIG. 4(B), the size of the fused resin block 3' can be minimized. With this there is a prevention of the generation of pin holes and in addition the finishing of the bag can be further improved. This invention was made also based on the fact found by the present inventors as a result of examination on the productivity that, when the zipper tape 2 is formed by miscellaneous shape extrusion molding, different from the conventional technology, in which the male strip 3a and female strip 3b each integrated with the tape section 4 are extrusion-molded only in a pair and in a row, by forming only the mating section 3 by means of miscellaneous shape extrusion-molding, then it is easy to give a desired form to the mating section 3 and in addition a plurality of pairs each of the male strip 3a and female strip 3b can be extrusion-molded in rows simultaneously.

Further the present invention is based on the fact that the productivity is substantially improved by making the mating sections 3 of the male strip 3a and female strip 3b by means of miscellaneous shape extrusion-molding respectively, fusing and bonding the mating sections 3 to a large-width film consisting of at least three layers previously laminated, slitting the male strips 3a and female strips 3b in the longitudinal direction after the strips are cooled to mate male strips with female strips one by one respectively to form the zipper tapes 2, and by winding the zipper tapes 2.

Another important technological factor of the present invention relates to the choice of at least resins used for the thermally fused film 7 and thermally fused film 8 for formation of a mating section each constituting the three-layered structure of the zipper tape 2 consisting of the thermally fused film 7 fused and bonded to an innermost layer of a bag, the heat-insulating film 6, and the thermally fused film 8 for formation of a mating section.

Figure 2A:
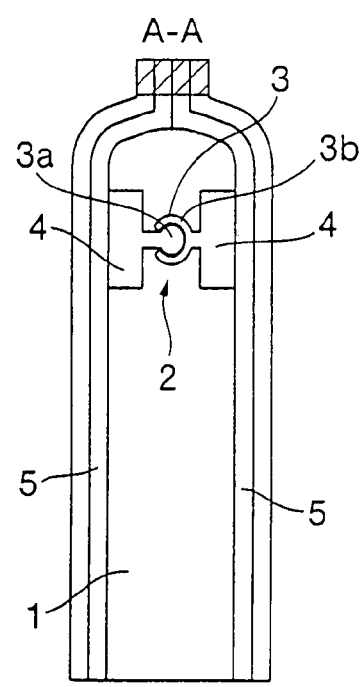
FIG. 2(A) is a cross-sectional view taken along the line A—A.
Figure 2B:
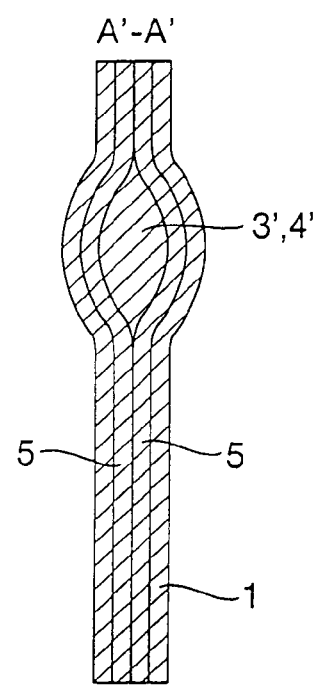
FIG. 2(B) is a cross-sectional view taken along the line A'—A'.
Figure 3A:
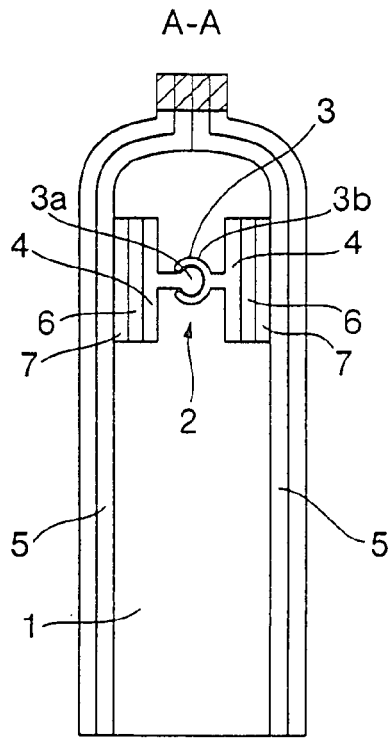
FIG. 3(A) is a cross-sectional view showing a bag using the conventional type of zipper tape consisting of three tape sections.
Figure 3B:
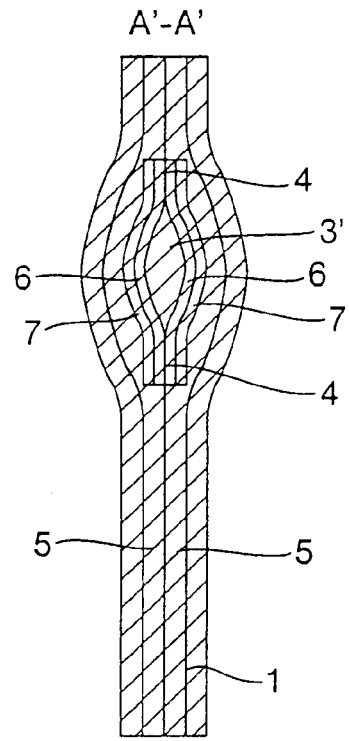
FIG. 3(B) is an explanatory view showing a resin block in a side heat seal section.
Figure 3C:
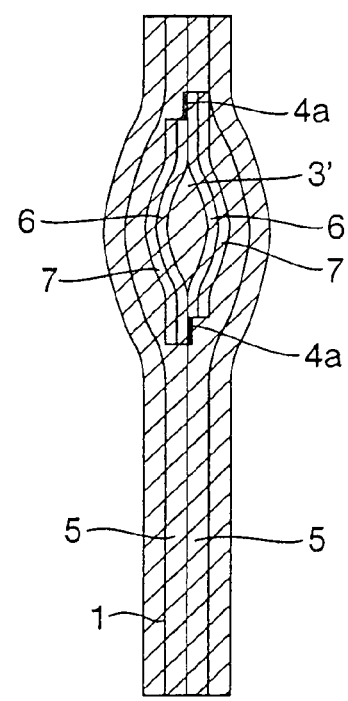
FIG. 3(C) is an explanatory view showing the state in which pin holes have been generated where the tape section is off from the regular portion in the side seal section.

Namely, in the conventional technology, the innermost layer of a bag for packaging is made from either a polyethylene-based resin or a polypropylene-based resin, and likely the mating section 3 is also made from either one of the two types of resins above. In a case of the mating section 3 made from a polyethylene-based resin, as shown in FIG. 2 and FIG. 3, it is preferable from the view point of fused resin blocks 3', 4' generated in the side seal sections 1a, 1b of the bag 1 that the polyethylene-based resin is as soft as possible. In that case, however, also the tape section 4 is formed in the integrated state with the mating sections, and the tape section 4 is also made from the same resin as that used in the mating section, and if the innermost layer 5 of the bag 1 is made from a polypropylene-based resin, the tape section is not thermally fused and boded to the innermost layer 5 of the bag 1. This is clearly understood from FIG. 2(A). In FIG. 3(A), if the thermally fused film 7 is made from a polypropylene-based resin, it seems that fusion bonding of the thermally fused film 7 to a polypropylene-based resin bag 1 with the innermost layer 5 made from a polypropylene-based resin would be possible, but when the side seals 1a, 1b are made in the bag 1, if the opposing tape sections 4 are off from the regular positions, the tape section 4 made from a polyethylene-based resin directly contact the innermost layer 5 of the polypropylene-based resin of the polypropylene-based resin bag 1 as shown in FIG. 3(C), and fusion bonding can not be performed in the directly contacting section 4a with pin holes generated therein, so that the polyethylene-based resin tape section 4 can not be used for the polyethylene-based resin bag 1. Even when the mating section 3 is made from a polypropylene-based resin, it can not be used for the polyethylene-based resin bag 1 for the same reason as described above.

For the reasons as described above, a second technological factor of the present invention based on the first basic feature is the requirement to produce all of the mating section 3, the thermally fused film 8 for formation of the mating section to which the male strip 3a and female strip 3b forming together the mating section 3, and the thermally fused film 7 to be fused and bonded to the innermost layer 5 of the bag 1 with the same material. Namely, the formation with either a polypropylene-based resin or a polyethylene-based resin is according to whether a resin-made film corresponding to the innermost layer 5 of the bag 1 is made from a polypropylene-based resin or a polyethylene-based resin.

In addition, specific applications must be taken into considerations for the same technological reason. When a pharmaceutical component having a higher permeability such as an anti-inflammatory analgesic agent is packaged inside a bag with a zipper, usually a film made from any of ethylene/acrylic acid copolymer (EAA) resin, ethylene/metacrylic copolymer-based metal ion bridged resin (ionomer), and ethylene/metacrylic acid copolymer resin (EMAA) is used for the innermost layer 5 of the bag 1. Such materials as a packaging material which can prevent permeation of a pharmaceutical component therethrough and can prevent a resulting reduction thereof.

Therefore, also in the zipper tape 2, it is necessary to use the same resin as that is used for the thermally fused innermost layer 5 of the bag 1 as a material for at least the thermally fused film 7 among the thermally fused film 7 to be fused and bonded to the innermost layer 5 of the bag 1, the thermally fused film 8 for formation of the mating section, and the mating section 3.

As for the heat-insulating film 6, this heat-insulating film 6 is necessary, when sealing is performed by applying a pressure and heat from outside of the bag 1 with the zipper tape 2 inserted between the innermost layers 5 of the bag 1 during the bag production process. This prevents the opposing thermally fused tapes 8 each for formation of a mating section from being thermally fused and bonded to each other as shown in FIG. 4(A). Further, this prevents the fused resin block 3' from being crushed under stable conditions by the application of a pressure and heat from the outside when side seals 1a, 1b of the bag 1 are made as shown in FIG. 4(B). A heat-resistant stretching film such as the biaxial stretching polyester film or biaxial stretching nylon film is preferable as a material for the heat-insulating film 6. Any type of film may be used so far as the film can satisfy the requirement for heat insulation.

A third technological factor of the present invention is based on a new technology according to the present invention for selection of a resin to be used for the thermally fused film 7 to be fused and bonded to the innermost layer 5 of the bag 1 and the selection of a thermally fused film 8 for formation of a mating section to fuse and bond the mating section 3.

Namely, in the construction of FIG. 4(A), it is necessary to select a polypropylene-based resin or a polyethylene-based resin as a material for the thermally fused film 7, which is to be fused and bonded to the innermost layer 5 of the bag 1, according to whether a material used for the innermost layer 5 of the bag 1 is a polypropylene-based resin or a polyethylene-based resin (this is not different from the invention described above. However, an olefin-based film comprising a resin in which, in addition to the polypropylene-based resin and polyethylene-based resin, an olefin-based resin such as polybutene or a polystyrene-based resin is mixed as a third component may be provided. As an alternative, a resin in which, in addition to the ethylene acetate vinyl copolymer resin and a polyethylene-based resin, an olefin-based reformer is mixed therein and is used as a third component as a material for the thermally fused film 8 for formation of a mating section to be fused and bonded to the mating section 3.

As the olefin-based film can advantageously be thermally fused and bonded to either a polypropylene-based resin or a polyethylene-based resin it is not necessary to select a polypropylene-based resin or a polyethylene-based resin as the mating section 3 according to whether a material for the innermost layer 5 of the bag 1 is a polypropylene-based resin or a polyethylene-based resin. This makes it possible to use the polyethylene-based resin which is softer and ensures the provision of a superior surface finish of the bag 1. Further, when the side seals 1a, 1b of the bag 1 are to be made as shown in FIG. 5(A) and (B), if the opposing thermally fused films 8 each for formation of a mating section are off from each other, this olefin-based film 8 for formation of a mating section can thermally be fused and bonded to the innermost layer 5 of the bag 1 at a place 8b where the thermally fused film 8 contacts the innermost layer 5 of the bag 1 regardless of whether a material for the innermost layer 5 of the bag 1 is a polypropylene-based resin or a polyethylene-based resin. As such, the thermal fusion and bonding may be performed under stable conditions without any pin hole being generated.

In FIG. 4(A), a fourth technological factor of the present invention relates to further selection of a resin to be used as a material for the thermally fused film 7 to be thermally fused and bonded to the innermost layer 5 of the bag 1. Further a selection is made for the thermally fused film 8 for formation of a mating section. The present invention is characterized in that an olefin-based film comprising a resin is used in which, in addition to the polypropylene-based resin and the polyethylene-based resin, an olefin-based rein such as polybutene or a polystyrene resin is mixed therein as a third component. As an alternative, a resin in which, in addition to the ethylene acetate vinyl copolymer resin and a polyethylene-based resin, an olefin-based reformer is mixed therein and is used as a third component as the thermally fused film 7 to be thermally fused and bonded to the innermost layer 5 of the bag 1 and also as the thermally fused film 8 for formation of a mating section.

The reason for employment of the olefin-based film is, as can be appreciated from the above description, that any type of mating section 3, thermally fused film 7, heat-insulating film 6 and even the thermally fused film 8 for formation of a mating section can be used regardless of whether a material for the innermost layer 5 of the bag 1 is a polypropylene-based resin or a polyethylene-based resin.

Thus, the zipper tape 2 according to the present invention can be used for a wide range of applications and types of the bag 1. Further, it can substantially improve the productivity in production of zipper tape 2 by allowing batch production of zipper tapes 2.

EXAMPLE 1

A base tape with the width of 120 mm based on a laminated structure consisting of a polyethylene film 40 μm as the thermally fused film 8 for formation of a mating section, a stretching polyester film 12 μm as the heat-insulating film 6, and a polyethylene film 40 μm as the thermally fused film 7 to be thermally fused and bonded to the innermost layer 5 of the bag 1 was previously prepared. Then the male strip 3a and the female strip 3b each made from a polyethylene-based resin were formed in 5 rows at a prespecified space therebetween by extrusion molding with a miscellaneous shape extrusion molding machine. These were thermally fused and bonded to the thermally fused film 8 for formation of a mating section. After temperature of the strips dropped, the thermally fused film 8 was slit along each of the male strips 3a and female strips 3b, providing a width of 12 mm along the longitudinal direction. Each male strip was mated with each female strip respectively with each pair slit wound up, and thus five strips of zipper tapes 2 were produced simultaneously with high productivity and excellent quality.

COMPARATIVE EXAMPLE 1

The male strip 3a and the female strip 3b each made from a polyethylene-based resin were produced respectively in the integrated state with the tape section 4 to form the zipper tape 2 based on the conventional technology by means of miscellaneous shape extrusion molding, but because of the necessity of giving a very complicated shape and form, the male strip 3a and the female strip 3b could be produced only in a pair and in a row, and it was extremely difficult to simultaneously produce the male strips and female strips in a pair and in a plurality of rows.

EXAMPLE 2

The zipper tape 2 in Example 1 can be produced by extrusion-molding only the male strip 3a and female strip 3b with high stability. The weight of the mating section 3 can be reduced to the minimum level, which is a new effect provided by the present invention. The weight including that of the base tape section can be reduced to about 5 g/m.

The zipper tape 2 according to the present invention was thermally fused and bonded to a film for the production of bags comprising a polyester film 12 μm, aluminum foil 9 μm, and a polyethylene film 60 μm along the longitudinal direction of each bag to be produced, and then side sections of the bag 1 were sealed by applying a pressure and heat thereto. As a result, a resin block including the zipper tape 2 was small, so that an excellent finish was provided to the side sections of the bag 1 and the appearance was very beautiful. In addition, no pin holes were generated, even if the male strip 3a was slightly off from the female strip 3b.

COMPARATIVE EXAMPLE 2

The zipper tape 2 obtained in Comparative Example 1 must be produced by extruding a large quantity of resin for the mating section 3 and the tape section 4 for achieving stability in the molded state, so that the weight of the zipper tape 2 is about 8 g/m.

This zipper tape 2 was thermally fused and bonded to a film for production of bags comprising a polyester film 12 μm, aluminum foil 9 μm, and a polyethylene film 60 μm along the longitudinal direction of each bag 1 to be produced, and the side sections of the bag 1 was made by applying a pressure and heat thereto. As a result, the resin block caused by the zipper tape 2 was very large, so that finishing of the side sections of the bag 1 was not so excellent with poor appearance. Further, when the male strip 3a was slightly off from the female strip 3b, generation of pin holes was observed.

EXAMPLE 3

The zipper tape 2 produced in Example 1 was thermally fused and bonded to a film for production of bags comprising a polyester film 12 μm, aluminum foil 9 μm, and a polyethylene film 60 μm along the longitudinal direction of each bag to be produced, and the side sections of the bag 1 was made by applying a pressure and heat thereto for sealing. As a result, the resin block caused by the zipper tape 2 was very small and was easily softened and crashed, so that a load to the film for the production of bags was small and bags could be produced even at the rate of 100 bags per minute without the aluminum foil being cut.

COMPARATIVE EXAMPLE 3

The zipper tape 2 produced in Comparative Example 1 was thermally fused and bonded to a film for production of bags comprising a polyester film 12 μm, aluminum foil 9 μm, and a polyethylene film 60 μm along the longitudinal direction of each bag to be produced, and the side sections of the bag 1 was made by applying a pressure and heat thereto for sealing. As a result, the resin block caused by the zipper tape 2 was large, and was slowly softened and hardly crashed, so that a load to the film for formation of bags was large and cutting of the aluminum foil occurred at the frequency of 60 bags per minute.

EXAMPLE 4

Figure 6:
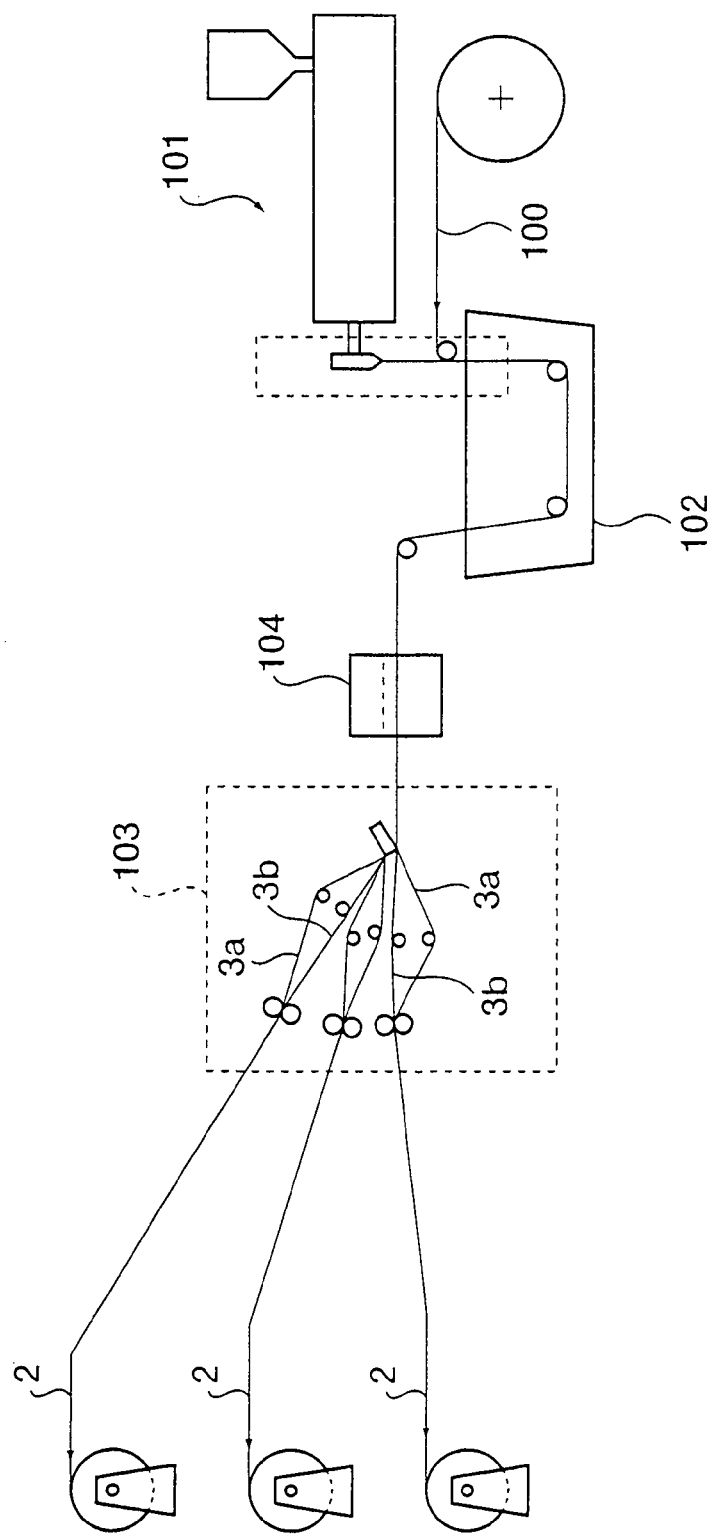
FIG. 6 is a flow diagram showing the method of producing a zipper tape according to a fourth embodiment of the present invention.
Figure 7:
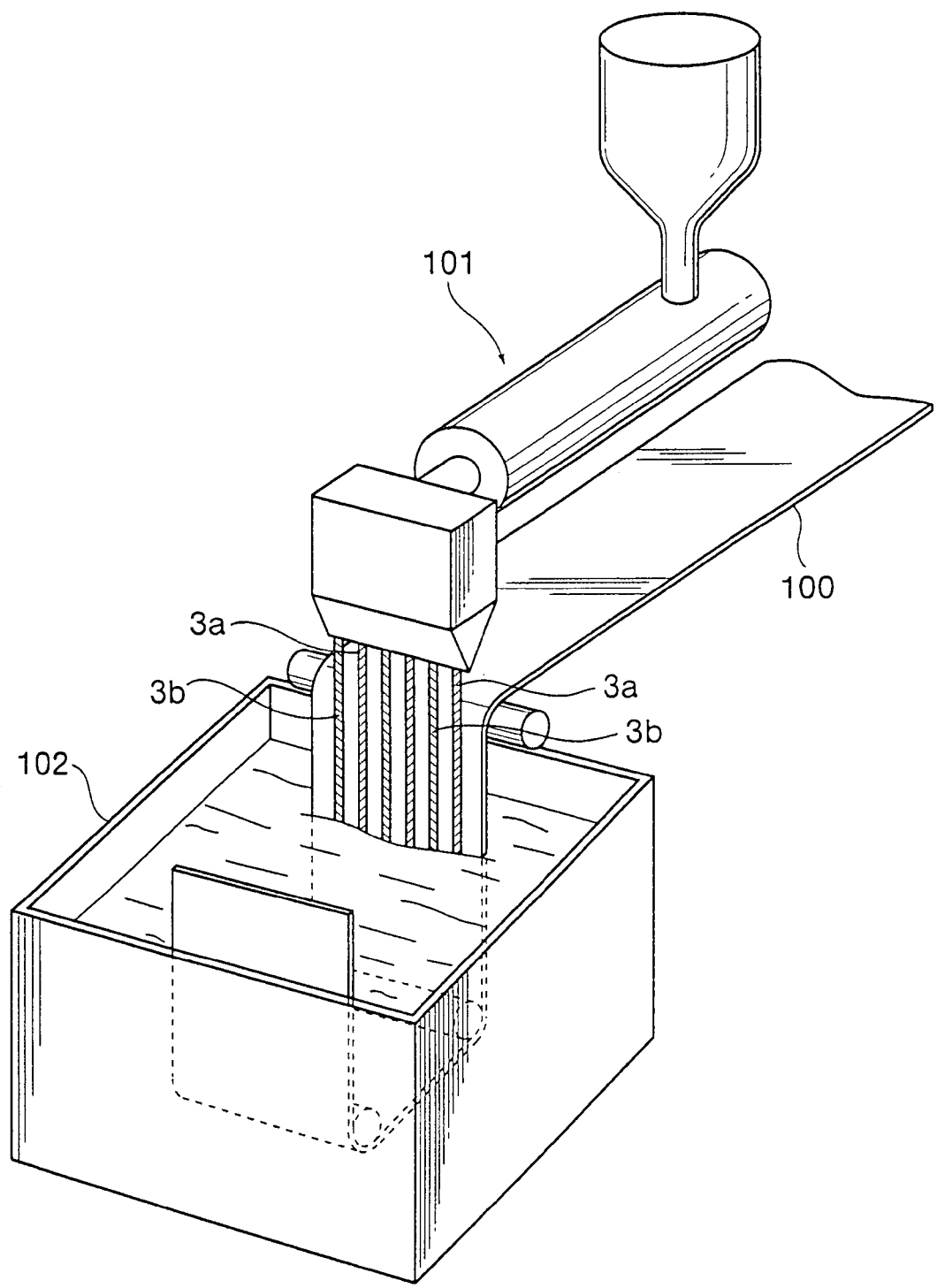
FIG. 7 is an explanatory view showing a miscellaneous shape extrusion molding machine.
Figure 8:
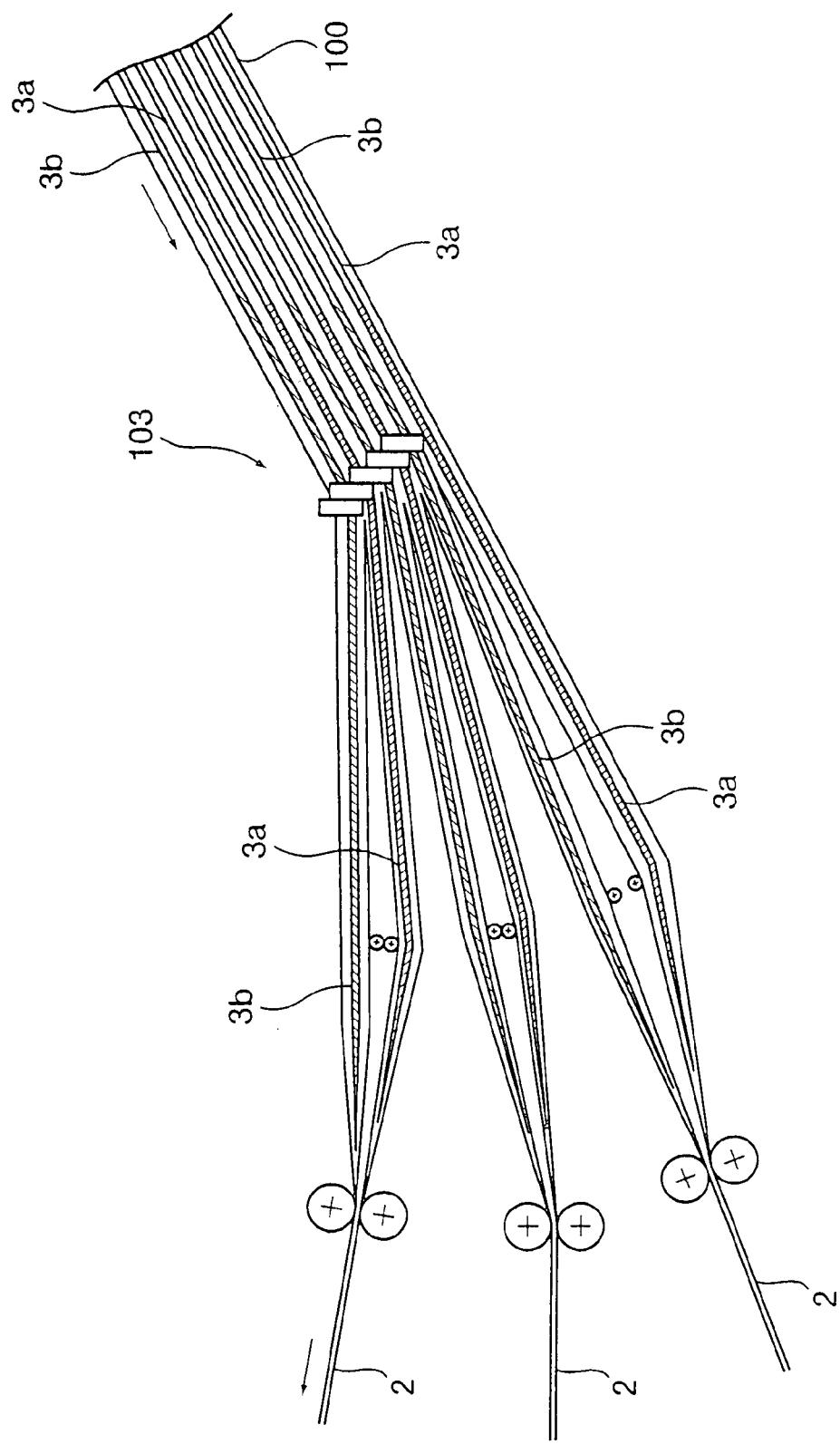
FIG. 8 is an explanatory view showing a slitter section.

Example 4 relates to the method of producing the zipper tape 2 wherein an innermost layer of the bag is a film made from any of ethylene-acrylic acid copolymer (EAA), ethylene-metacrylic acid copolymer metallic ion bridging resin (ionomer), and an ethylene-metacrylic acid copolymer resin (EMAA), of the thermally fused film and the thermally fused film for formation of a mating section, at least the former is made from the same resin as that described above. The method is shown in the general flow diagram of FIG. 6 with the mating section forming section shown in FIG. 7, and the state where the male strip 3a and female strip 3b are mated with each other to produce the zipper tape 2 is shown in FIG. 8. At first, a base tape 100 for a wide film with the width of 72 mm based on a laminated structure consisting of an olefin-based film 50 μm (CMPS film produced by Tocello Kabushiki Kaisha) made from a resin in which, in addition to a polypropylene-based resin and a polyethylene-based resin as the thermally fused film 8 for formation of a mating section, a polybutene-based resin or the like is mixed therein as a third component, stretching polyester film 12 μm as a heat-insulating film 6, and a polypropylene film 40 μm as the thermally fused film 7 to be thermally fused and bonded to the bag 1 was previously prepared. The male strips 3a and the female strips 3b each made from a polyethylene-based resin and forming a pair respectively are alternately molded at a prespecified space therebetween in three rows with a miscellaneous shape extrusion-molding machine 101. The strips 3a and 3b were thermally fused and bonded to the side of thermally fused film 8 of the base tape 100, and after the male strip 3a and female strip 3b were cooled in a water bath 102, the male strips 3a and female strips 3b were cut out each with the width of 12 mm along the longitudinal direction of the base tape 100 with a slitter 103, and then the male strips 3a and female strips 3b were mated with each other one by one to form pairs and wound up. Three strips of zipper tapes were produced simultaneously. The reference numeral 104 in the figure indicates a drier.

This zipper tape 2 was thermally fused and bonded to a film for formation of bags comprising a polyester film 12 μm and a polypropylene film 60 μm along the longitudinal direction of each bag 1 to be produced and the side sections of the bag 1 was made by applying a pressure and heat for sealing. As a result, when the innermost layer of the bag 1 was made from a polypropylene-based resin, the bag 1 with the zipper tape 2 having no sealing fault and excellent in sealing capability could be produced even when the mating section 3 was made from a polyethylene-based resin.

COMPARATIVE EXAMPLE 4

An attempt was made to try to thermally fuse and bond the polyethylene-based zipper tape 2 produced in Comparative Example 1 to a film for formation of bags (with the innermost layer made from a polypropylene film). However, the zipper tape 2 could not be fused nor bonded to the film for formation of bags, and therefore to enable thermal fusion and bonding, a bag with a zipper could be produced only with the zipper tape 2 made from a polypropylene-based resin.

EXAMPLE 5

Figure 9:
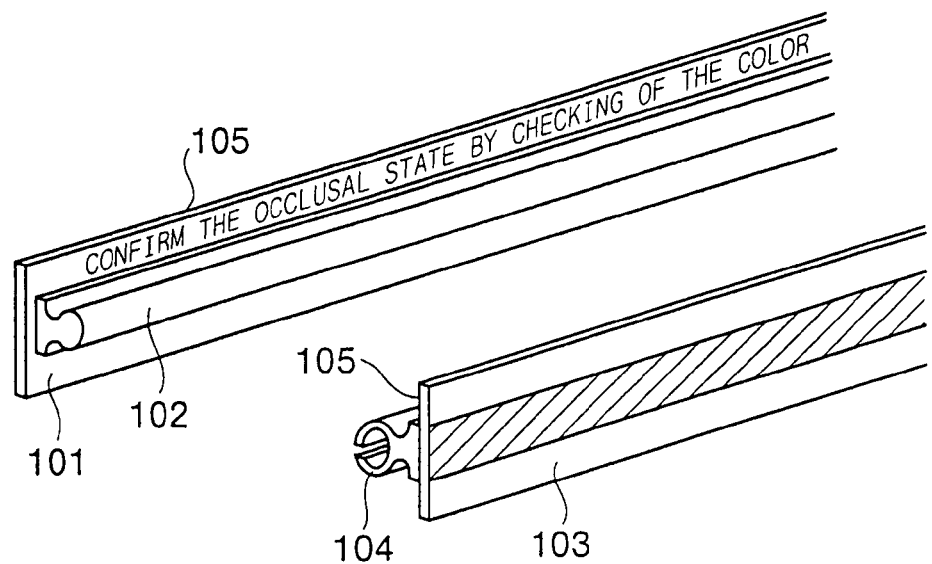
FIG. 9 is an explanatory view showing the zipper tape according to the present invention.

FIG. 9 shows a zipper tape according to the present invention in which a base tape 101 is provided with a male strip 102 thermally fused and bonded to a surface of the base tape 101. A female strip side base tape 103 is provided with a female strip 104 thermally fused and bonded to a surface of the base tape 103. The male strip 102 and female strip 104 can freely be mated with each other or disengaged with each other.

The base tape 101, 103 has a three-layered structure in this example, and the outer layer (a layer which is heat-sealed to an inner surface of a bag) and an inner layer (a layer to which the male strip 102 and female strip 104 are thermally fused and bonded) are formed with a polyethylene-based resin. An intermediate layer is inserted between the outer layer and the inner layer and is made from a biaxial stretching polyester film. Both the male strip 102 and female strip 104 are made from a polyethylene-based resin. It should be noted that these materials are only illustrative, and other types of films and resins may be used according to the required function.

The reference numeral 105 indicates a remark printed on a surface in the male strip 102 side of the base tape 101 and in the female strip 104 side of the base tape 103 and indicating the necessity of "checking the mating state".

Figure 10:
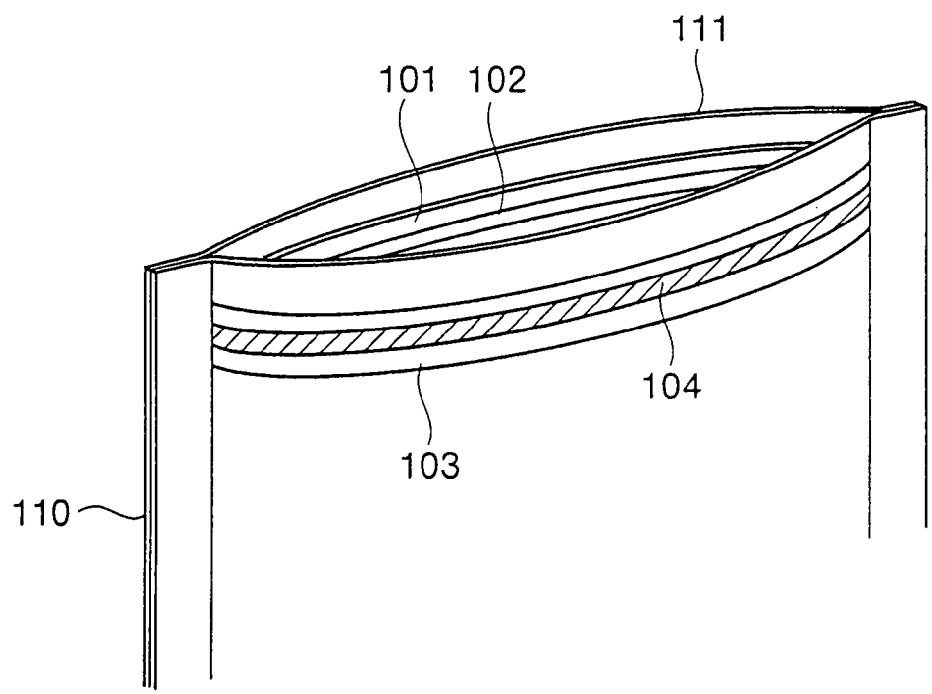
FIG. 10 is an explanatory view showing the state in which the zipper tape is fitted to inside of an open section of a bag.

FIG. 10 shows the state in which the zipper tape described above is fitted to inside of an upper open section 111 of a bag 110, and the base tapes 101, 103 in the male strip side and female strip side respectively are heat-sealed and facing to inner surfaces of the open section 111 of the bag 110 by means of heat sealing. As indicated by the description above, a polyethylene film layer is formed for heat sealing on an inner surface of the bag 110 in this example.

Figure 11:
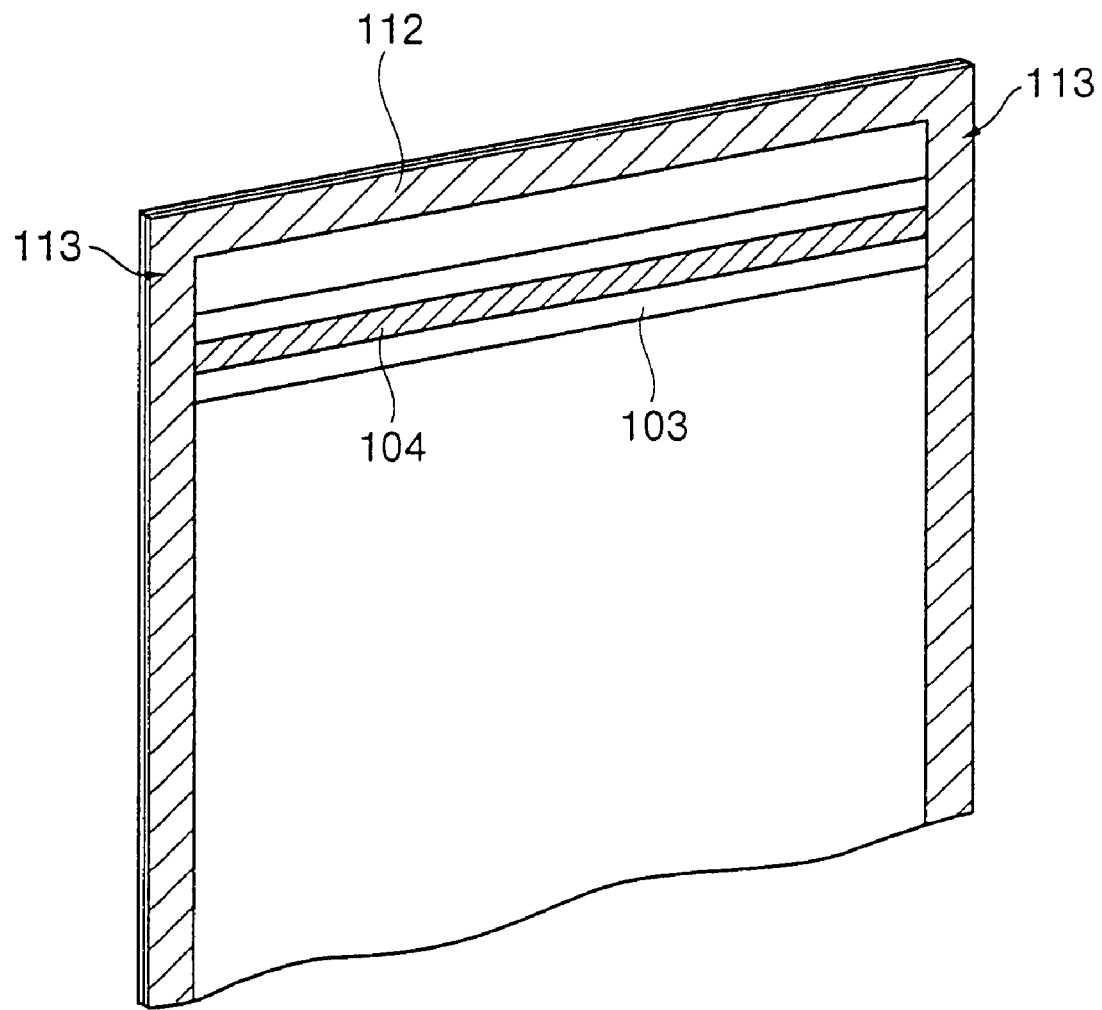
FIG. 11 is an explanatory view showing the state in which an open section of a bag with a zipper had been closed by means of heat sealing.

FIG. 11 is an explanatory view showing the state where the zipper is closed and in addition the open section 111 of the bag 110 has been closed with a seal 112 by the heat sealing method after contents are filled in. The reference numeral 113 indicates a V-shaped cut, and the open section 111 of the bag 110 can be opened from this section as shown in FIG. 10.

A remark indicating the necessity of checking the mating state is printed on an inner surface of the base tape 101 or 103 (in the mating section). With this, when the open section 111 of the bag 110 is sealed again, the mating state is checked to prevent unexpected accidents such as leakage of contents from the zipper section.

By giving a specific color to the base tape 101 or 103, the color can visually be checked from the outside, and a user can easily recognize that the bag has a zipper.

Further by using different colors for the base tape 101 and base tape 103 respectively, it is possible to freely design front and back sides of the bag 110 without being restricted by the zipper, which improves freedom in designing.

With a further feature according to a variant of the invention, by giving different colors to the male strip 102 and female strip 104 in the mating section respectively, it is possible for a user to visually check whether the two strips have been completely mated or not by checking changes in the colors.

EXAMPLE 6

Figure 12:
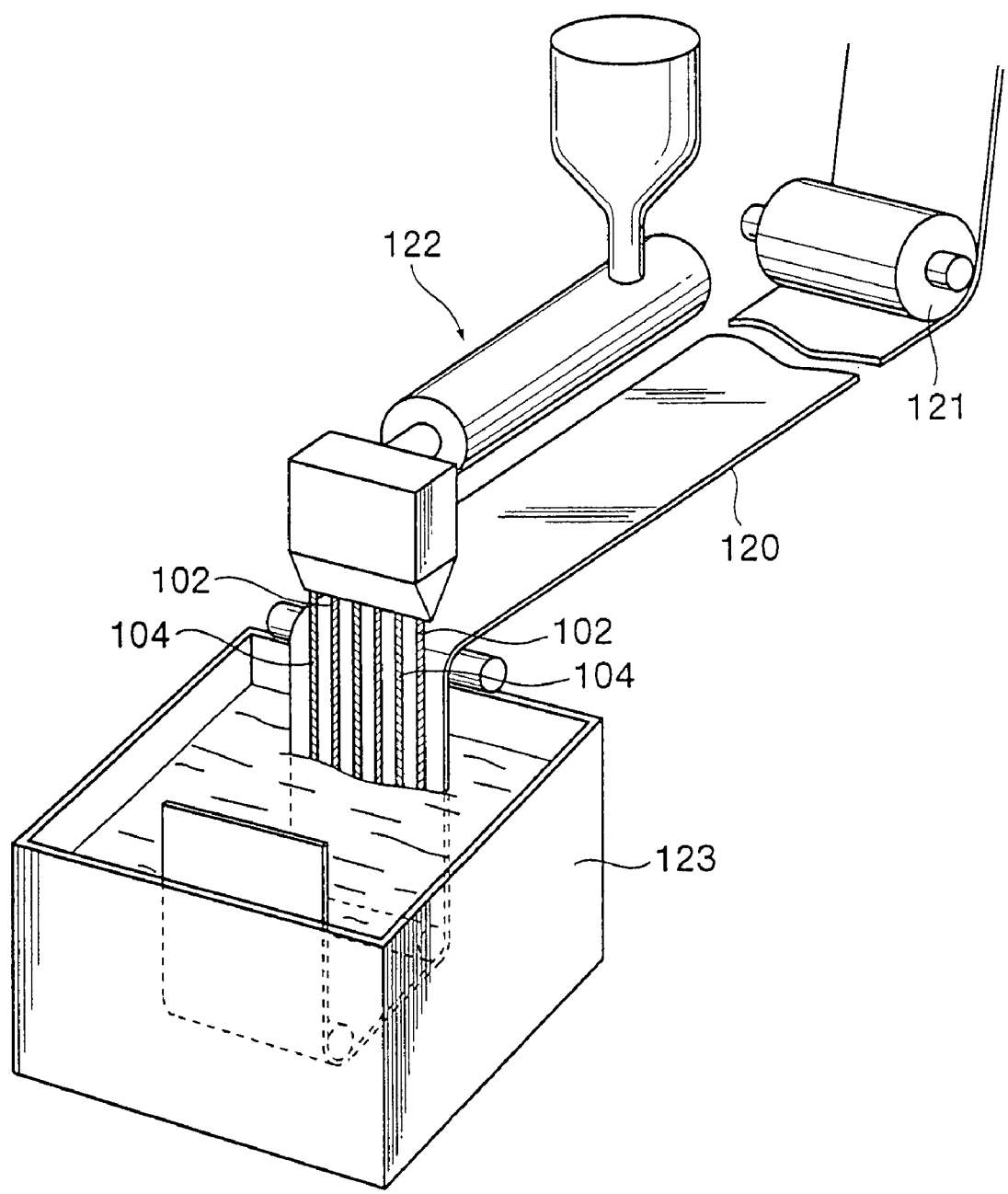
FIG. 12 is an explanatory view showing a method of producing the zipper tape according to the present invention.
Figure 13:
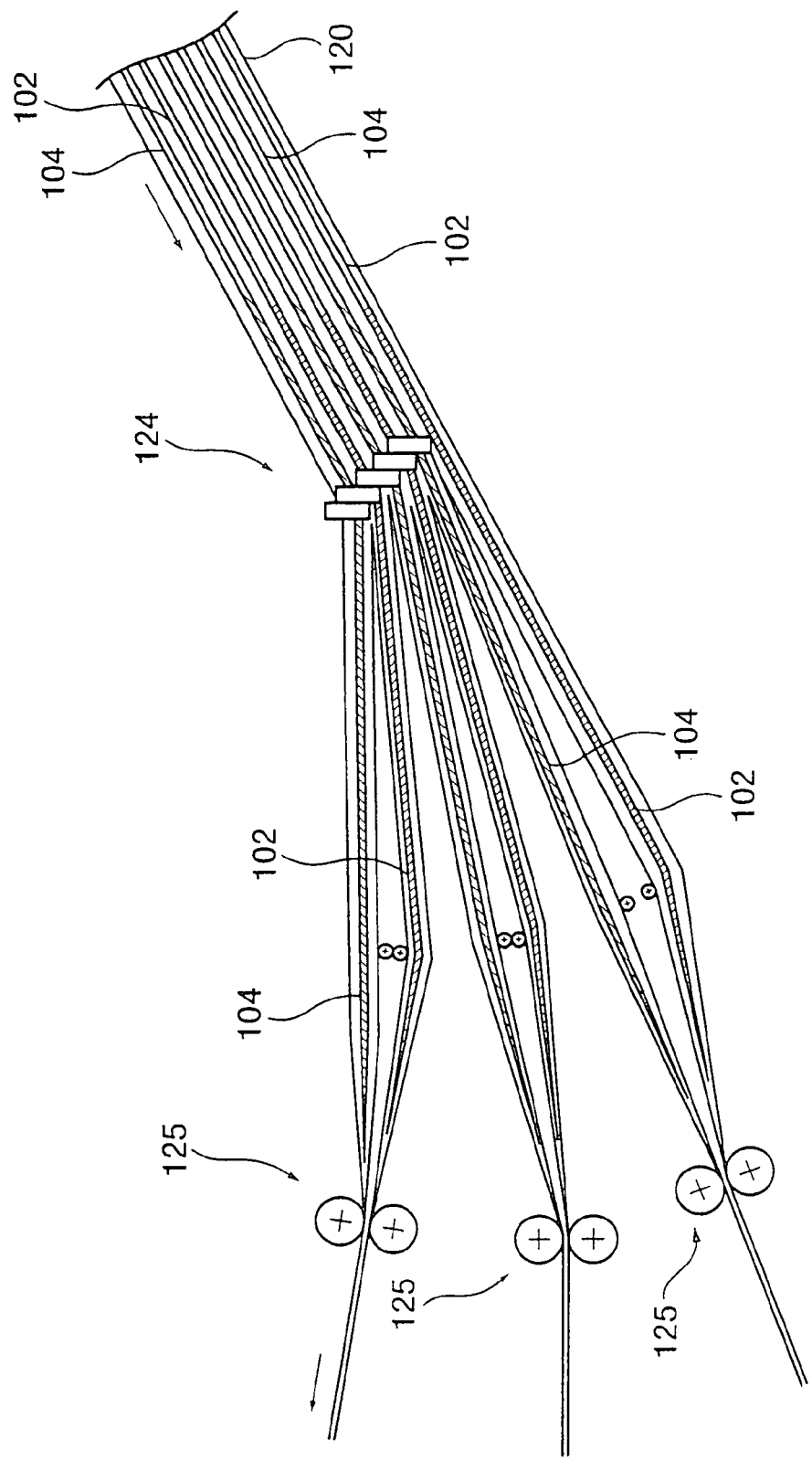
FIG. 13 is an explanatory view showing a method of producing a zipper tape having a mating section with different colors according to the present invention.

This example 6 is illustrated in FIG. 12 and shows the state where a zipper tape is being produced by extruding the male strips 102 and female strips 104 onto the wide base film 120 with a miscellaneous shape extrusion molding machine. In FIG. 12, a base tape film 120 is shown before being split into the base tapes 101 and base tapes 103. This base tape film 120 is fed out from the roll. The remark 105 is printed by a cylinder 121 for printing the remark 105. Then, at the location of a miscellaneous shape extrusion molding machine 122, the male strips 102 and females strips 103 are alternately extruded from a die of this miscellaneous shape extrusion molding machine 122. These male strips 102 and female strips 104 are thermally fused and bonded to the base tape film 120 and then cooled by water in a cooling water bath 123. Finally the base tape is slit along each strip by a slitter 124 as shown in FIG. 13 and the adjoining male strips and female strips are mated with each other by a mating machine 125 respectively and wound up.

Figure 14:
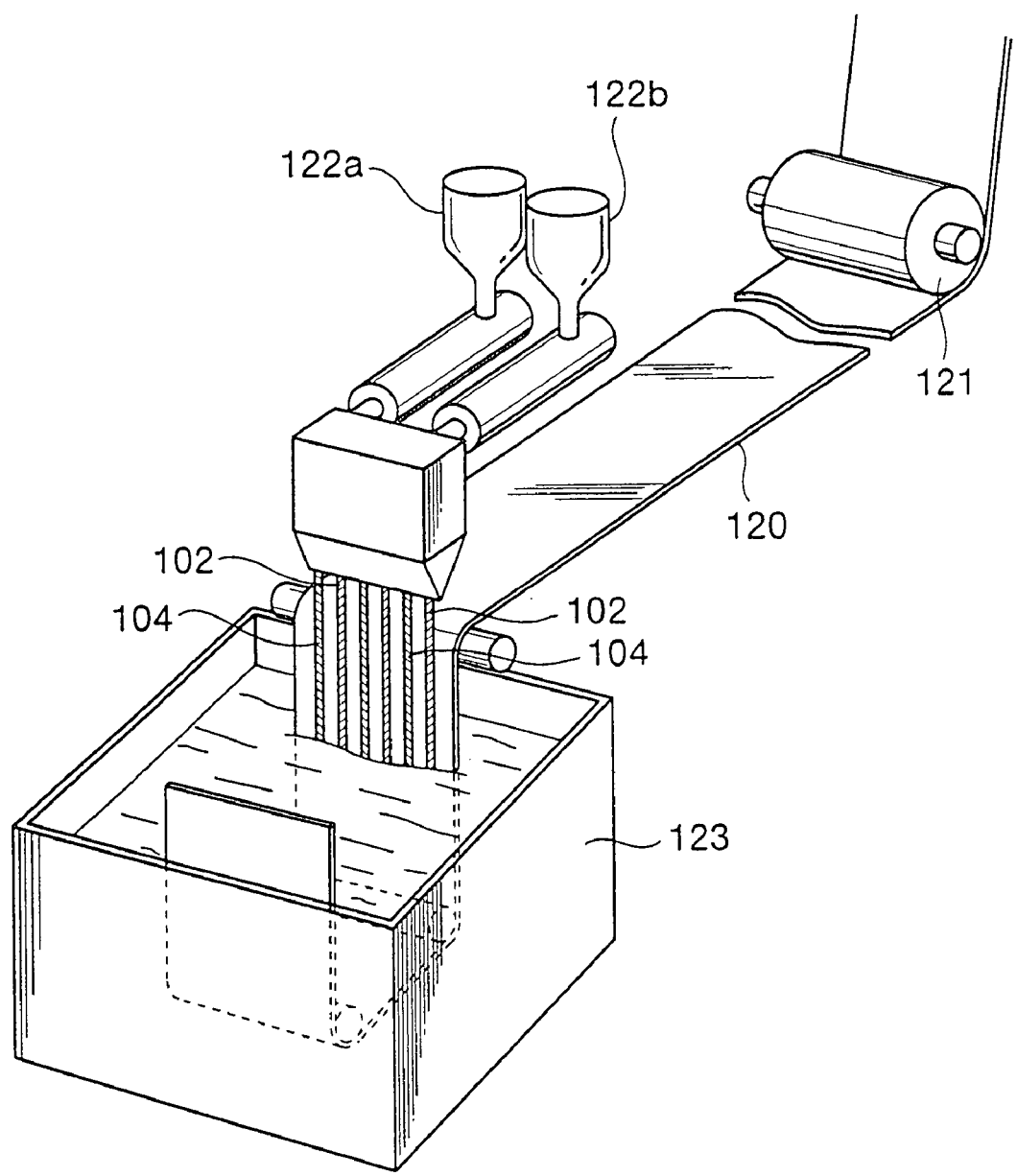
FIG. 14 is an explanatory view showing the state in which a male mating section and a female mating section are formed by using different extrusion molding machines respectively.

FIG. 14 shows a state where the male strips 102 and female strips 104 are colored with different colors. In such case different extrusion molding machines 122a and 122b are used for molding the male strips 102 and female strips 104 respectively. Resins with different coloring materials mixed therein are filled in the extrusion molding machines, so that the male strips 102 and female strips 104 can thermally be fused and bonded to the base tape 120.

EFFECTS OF THE INVENTION

As described above, the present invention is different from the conventional technology in which a male strip and a female strip are formed in the integrated state on a base tape of a zipper tape, a male strip and a female strip are later formed by fusion bonding on a surface of a thermally fused film for formation of a mating section. As a result, the following advantageous effects are provided.

1. In production of a zipper tape, male strips and female strips can simultaneously be formed in a plurality of rows in the state where adjoining male strips and female strips form pairs respectively, so that the productivity is far higher as compared to the conventional technology in which a male strip and a female strip are formed in a pair.
2. In a side seal section where zipper tapes are overlaid on each other when a bag is formed, a resin block in the mating section including a thermally fused film for formation of the mating section is small, which insures excellent appearance of the bag.
3. Because the resin block is small, it is possible to overcome the trouble caused by excessive heat applied in heat sealing, and in addition the bag production speed can be improved.
4. By using a specific resin film which can thermally be fused and bonded to both a polypropylene-based film and a polyethylene-based film as a thermally fused film for formation of a mating section, for instance, it is possible to use a zipper tape having a mating section made from polyethylene and this can also be used for a bag with the innermost layer made from polypropylene.
5. By giving or printing specific colors, marks, or letters to the male strip and female strip for mating on a base tape of the zipper tape, it is possible to check from the outside the fitted state of the zipper in a bag in which at least the zipper section is transparent or semi-transparent.
6. As letters, marks, and colors can be given or printed in the mating section side of the base tape, this printed letters or marks can visually be checked when the zipper tape is opened, and a remark or the like can conveniently be printed on a surface of this base tape.
7. By using different colors for a male strip and a female strip forming a mating section, the mated state can visually be checked when the two strips are mated with each other.
8. By giving specific marks, patterns, or colors to an outer surface of the zipper tape, the colorful design of the bag can be made even in the zipper section.

What is claimed is:

1. A zipper tape for a bag with a male stripe and a female stripe as a mating section on a base tape produced by forming a plurality of pairs of the male stripe and the female stripe each pair extending in a row on the base tape with large width and cutting the base tape by each of the male strip and the male stripe, and having at least a three-layered structure comprising a thermally fused film which is heat-sealed onto an innermost layer of the bag, a heat-insulating film having a higher melting point than that of the thermally fused film laminated on a surface of the thermally fused film, and a thermally fused film for formation of a mating section laminated on a surface of the heat-insulating film, said male strip and said female strip being extruded from a miscellaneous shape extrusion molding machine and being respectively thermally fused and bonded to a surface of the respective thermally fused film for formation of said mating section, wherein a polypropylene-based resin or a polyethylene-based resin is used for the thermally fused film in the base tape which is heat-sealed onto the innermost layer of the bag and an olefin-based resin comprising;
   a. a resin in which, in addition to a polypropylene-based resin, a polyethylene-based resin and an olefin-based resin including a polybutene as a third component is mixed;
   b. a resin in which, in addition to a polypropylene-based resin, a polyethlene-based resin and a polystyrene resin as a third component is mixed; or
   c. a resin in which, in addition to an ethylene acetate vinyl copolymer resin, a polyethylene-based resin and an olefin-based reformer as a third component is mixed is used as the thermally fused film for formation of the mating section.

2. A zipper tape for a bag according to claim 1 wherein, when an innermost layer of the bag is a film made from any of ethylene-acrylic acid copolymer (EAA), ethylene-metacrylic acid copolymer metallic ion bridging resin (ionomer), and an ethylene-metacrylic acid copolymer resin (EMAA), of the thermally fused film and the thermally fused film for formation of a mating section, at least the former is made from the same resin.

3. A zipper tape for a bag according to claim 1, wherein an olefin-based resin comprising;

a resin in which, in addition to a polypropylene-based resin, a polyethylene-based resin and an olefin-based resin including a polybutene as a third component is mixed;

a resin in which, in addition to a polypropylene-based resin, a polyethlene-based resin and a polystyrene resin as a third component is mixed; or a resin in which, in addition to an ethylene acetate vinyl copolymer resin, a polyethylene-based resin and an olefin-based reformer as a third component is mixed is used for the thermally fused film which is heat-sealed on to the innermost layer of the bag and the thermally fused film for formation of a mating section in the base tape.

* * * * *